United States Patent [19]

Looman et al.

[11] Patent Number: 5,017,118
[45] Date of Patent: May 21, 1991

[54] APPARATUS FOR FORMING A COEXTRUSION FROM EXTRUDED STRIPS

[75] Inventors: Ernest W. Looman, Tallmadge; Harold A. Wolbert, North Canton, both of Ohio

[73] Assignee: The Goodyear Tire & Rubber Company, Akron, Ohio

[21] Appl. No.: 560,800

[22] Filed: Jul. 31, 1990

Related U.S. Application Data

[63] Continuation of Ser. No. 367,269, Jun. 16, 1989, abandoned.

[51] Int. Cl.⁵ .................. B29C 47/06; B29C 47/14
[52] U.S. Cl. ...................... 425/133.5; 156/244.11; 264/171; 264/176.1; 425/183; 425/197; 425/325; 425/462; 425/467
[58] Field of Search .............. 425/131.1, 133.5, 141, 425/133.1, 183, 185, 190, 191, 193, 194, 461, 462, 466, 467, 192 R, 327, 374, 325; 118/411; 156/500, 501, 244.1, 241.27; 264/171, 175, 176.1

[56] References Cited

U.S. PATENT DOCUMENTS

| 3,142,091 | 7/1964 | Curtiss | 425/214 |
| 3,253,073 | 5/1966 | Skobel | 264/174 |
| 3,439,383 | 4/1969 | Meitinger | 425/128 |
| 3,871,810 | 3/1975 | Geyer | 425/374 |
| 3,956,056 | 5/1976 | Boguslawski et al. | 156/500 |
| 4,299,789 | 11/1981 | Giesbrecht | 264/176.1 |
| 4,526,528 | 7/1985 | Kline et al. | 425/133.5 |
| 4,539,169 | 9/1985 | Nixon et al. | 264/171 |
| 4,669,965 | 6/1987 | Murakami | 264/171 |
| 4,863,765 | 9/1989 | Ishizuka | 264/171 |

FOREIGN PATENT DOCUMENTS

| DE3212157 | 3/1983 | Fed. Rep. of Germany . |
| 2534520 | 4/1984 | France . |
| 1590378 | 6/1981 | United Kingdom . |

Primary Examiner—Jay H. Woo
Assistant Examiner—Khanh P. Nguyen
Attorney, Agent, or Firm—Frederick K. Lacher; T. P. Lewandowski

[57] ABSTRACT

A laminated roller die extension assembly (22) for mounting in a die holder (24) including a grooved die member (32) with a grooved surface (34) and a plate die (44) with a flat surface abutting the grooved surface (34) forming a preformer passage (54) in communication with an opening at a cylindrical surface (26) of the roller die extrusion assembly (22), and the plate die (44) having an indented edge (68) for guiding and shaping a strip applied through the opening onto a roller die (28) which is rotated past the opening.

10 Claims, 7 Drawing Sheets 5,017,118

APPARATUS FOR FORMING A COEXTRUSION FROM EXTRUDED STRIPS

This is a Continuation, of application Ser. No. 07/367,269 filed Jun. 16, 1989 now abandoned. su This invention relates generally to the forming of a band or coextrusion of elastomeric material containing more than one compound on a roller die. This is desirable for different tire components such as treads and sidewalls.

DESCRIPTION OF THE RELATED ART

Heretofore it has been proposed to extrude two or more compounds from multiple extruders through separate orifices in a die member onto a roller at circumferentially spaced positions. A replaceable preform insert has also been proposed to provide preform passages having different shapes in the same die head. Replaceable finish dies have also been proposed for fastening on the face of the die head to provide desired shaping and guiding of the strips applied to the roller. Although this roller die apparatus is effective, the cost of the drilling and hand finishing required to make the die head insert and finish dies has limited the use of this equipment. The precise machining and hand finishing required has also limited the size of the apparatus to a size sufficiently large enough so that the die opening in the die head is accessible to the machinist fabricating the apparatus.

SUMMARY OF THE INVENTION

The present invention is directed to a laminated die assembly for mounting in a die holder in which the parts can be machined on a three-axis milling machine. Plate dies are utilized which have indented edges for shaping and guiding the strips applied to the roller as well as flat surfaces for abutting grooved surfaces of the die members to provide the preform passages. The die members also have indented edges at the cylindrical surface of the die assembly for shaping and guiding the strips applied to the roller.

In accordance with one aspect of the invention there is provided a roller die extrusion apparatus for combining two or more extruded strips of elastomeric materials into a single coextrusion, the apparatus having a roller with an axis circumvented by a roller surface and means for rotating the roller about the axis, a die head having flow channels in communication with extruders for supplying the strips, a die holder mounted on the die head and positioned adjacent to the roller surface, laminated die means mounted in the die holder and having a cylindrical surface conforming substantially to the roller surface, the laminated die means comprising a grooved die member having grooved surfaces forming preform passages from the flow channels to openings in the cylindrical surface of the laminated die means, a downstream plate die disposed between the grooved die member and the die holder, at least one of the grooved surfaces of the grooved die member being in abutting engagement with the downstream plate die forming at least one of the preform passages, and indentations at an edge of the downstream plate die and at an edge of one of the grooved die members adjoining the roller surface for shaping and guiding the strips after application to the roller surface to form the single coextrusion.

In accordance with another aspect of the invention there is provided a roller die extrusion apparatus for combining two or more extruded strips of elastomeric materials into a single coextrusion, the apparatus having a roller with an axis circumvented by a roller surface and means for rotating the roller about the axis, a die head having flow channels in communication with extruders for supplying the strips, a die holder mounted on the die head and positioned adjacent to the roller surface, a laminated die means mounted in the die holder and having a cylindrical surface conforming substantially to the roller surface, the laminated die means comprising a grooved die member having grooved surfaces forming preform passages from the flow channels to openings in the cylindrical surface of the laminated die means, a downstream plate die disposed between the grooved die member and the die holder, at least one of the grooved surfaces of the grooved die member being in abutting engagement with the downstream plate die forming at least one of the preform passages, and indentations at an edge of the downstream plate die and at an edge of the grooved die member adjoining the roller surface for shaping and guiding the strips after application to the roller surface to form the single coextrusion.

To acquaint persons skilled in the arts most closely related to the present invention, certain preferred embodiments thereof illustrating best modes now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

BRIEF DESCRIPTION OF THE PREFERRED EMBODIMENTS

Figure 1:
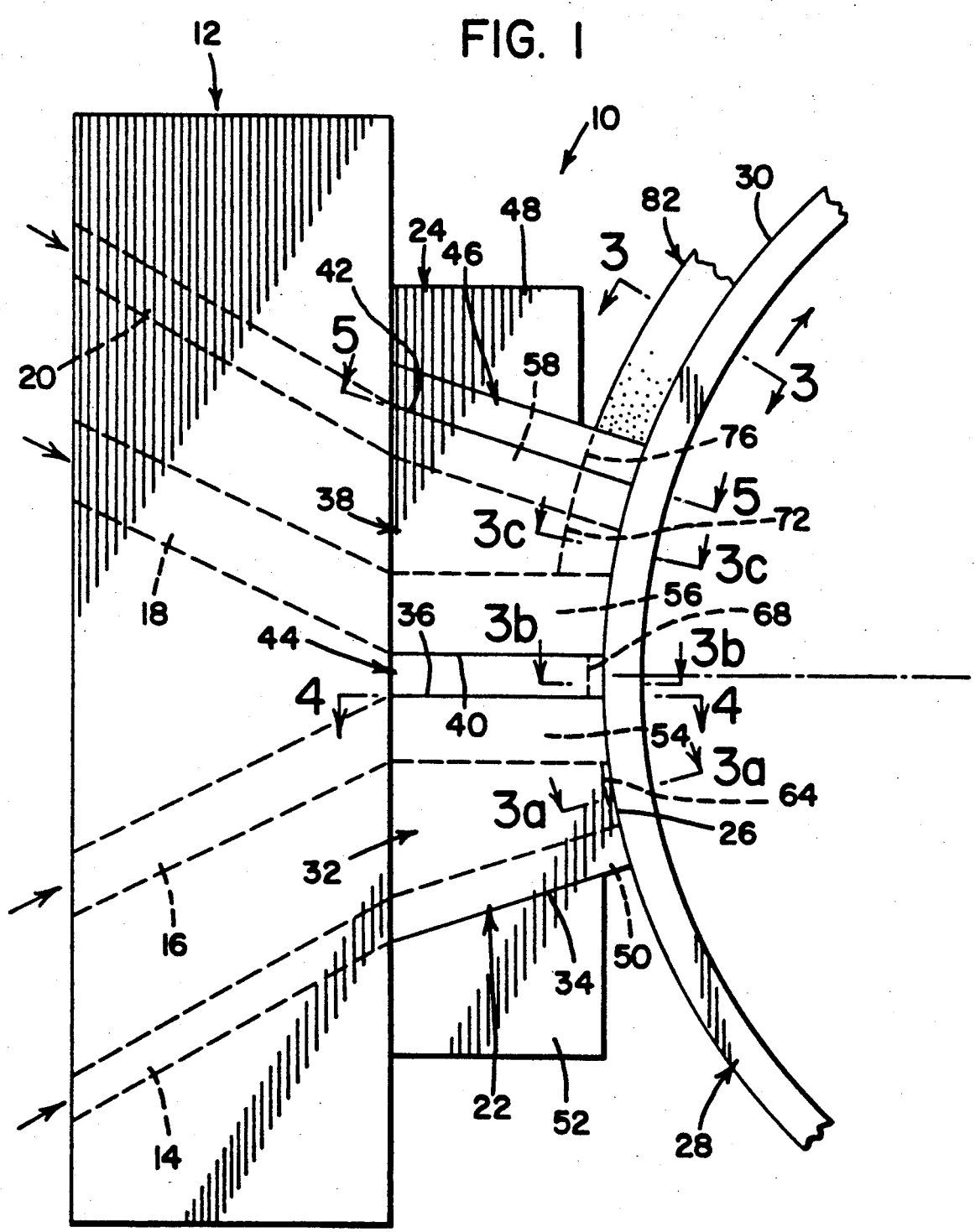
FIG. 1 is a schematic side view of a quadruple roller die assembly embodying the invention with flow channels shown in dotted lines.

Referring to FIGS. 1 through 5, a quadruple roller die extrusion apparatus 10 embodying the invention is shown for extruding a plurality of strips of elastomeric material to form a single coextrusion. As shown schematically in FIG. 1, a die head 12 has a first flow channel 14, a second flow channel 16, a third flow channel 18 and a fourth channel 20 in communication with extruders (not shown) for supplying elastomeric material to a laminated die means 22 supported in a die holder 24 mounted on the die head 12. The laminated die means 22 has a generally cylindrical surface 26 in closely spaced relation to a roller 28 with an axis circumvented by a roller surface 30. Means for rotating the roller 28 in a clockwise direction, as shown in FIG. 1, may be provided. In this description the clockwise direction will be designated as downstream and the counterclockwise direction will be designated as upstream.

The laminated die means 22 includes a first grooved die member 32 having an upstream grooved surface 34 and a downstream grooved surface 36. A second grooved die member 38 is positioned downstream of the first grooved die member 32 and has an upstream grooved surface 40 and a downstream grooved surface 42.

An upstream plate die 44 is disposed between the first grooved die member 32 and second grooved die member 38. A downstream plate die 46 is disposed between the second die member 38 and a surface of a retaining member 48 of the die holder 24.

Figure 5:
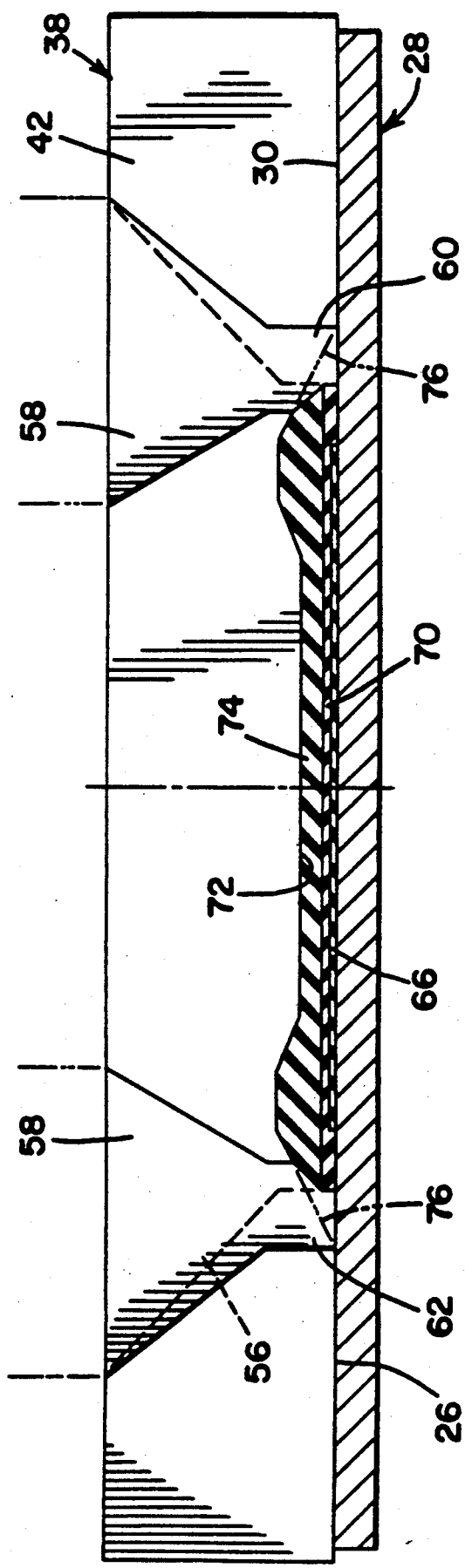
FIG. 5 is a plan view of the downstream grooved surface of the upper second die member taken along line 5—5 in FIG. 1.

The strip extruded through the first flow channel 14 is then extruded through a first preform passage 50 defined by the upstream grooved surface 34 of the first grooved die member 32 and the abutting surface of a retaining member 52 of the die holder 24. A second preform passage 54 is in communication with the second flow channel 16 and is defined by the downstream grooved surface 36 of the first grooved die member 32 and the upstream plate die 44. A third preform passage 56 is in communication with the third flow channel 18 and is defined by the upstream grooved surface 40 of the second grooved die member 38 and the surface of the upstream plate die 44. A fourth preform passage 58 is in communication with the fourth flow channel 20 and is defined by the downstream grooved surface 42 of the second grooved die member 38 and the surface of the downstream plate die 46. The fourth preform passage 58 may be bifurcated, as shown in FIG. 5, and be in communication with openings 60 and 62 in the cylindrical surface 26. If desired, the preform passages 58 may each be in communication with a flow channel 20 which is in communication with a separate extruder so that two different materials may be supplied through the openings 60 and 62. It is also contemplated that in certain applications other preform passages may be divided into two or more parts in communication with separate openings and separate flow channels supplied by separate extruders.

Figure 2:
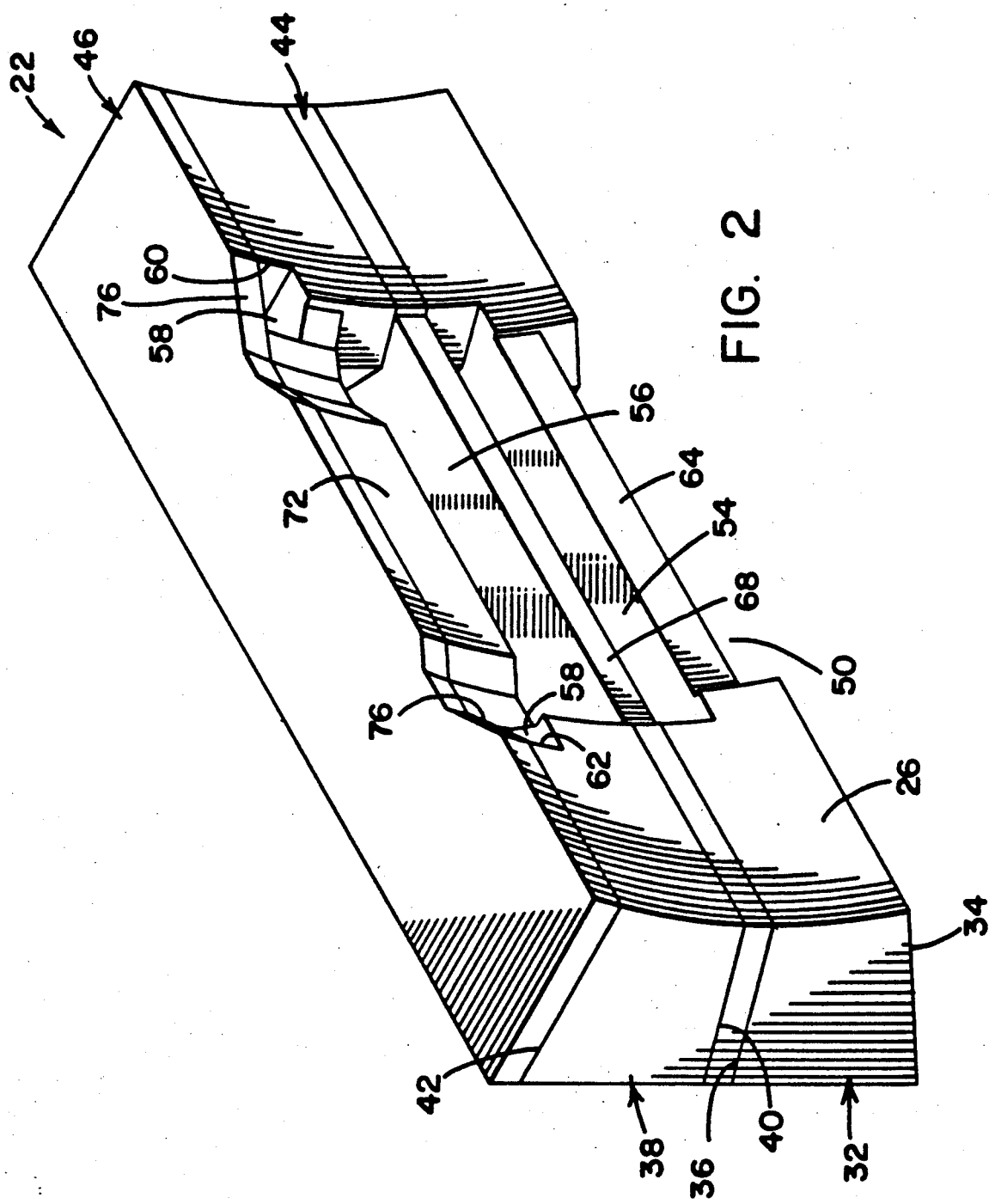
FIG. 2 is a perspective view of the laminated die of the assembly.
Figure 3:
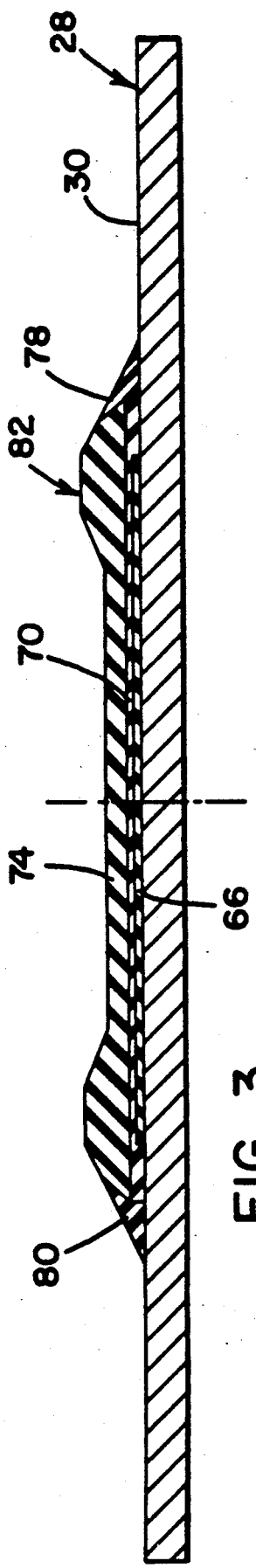
FIG. 3 is a sectional view of a formed coextrusion taken along line 3—3 in FIG. 1 showing the contour of the strips as applied and shaped at sections along lines 3a—3a, 3b—3b, 3c—3c and 3—3 in FIG. 1.
Figure 4:
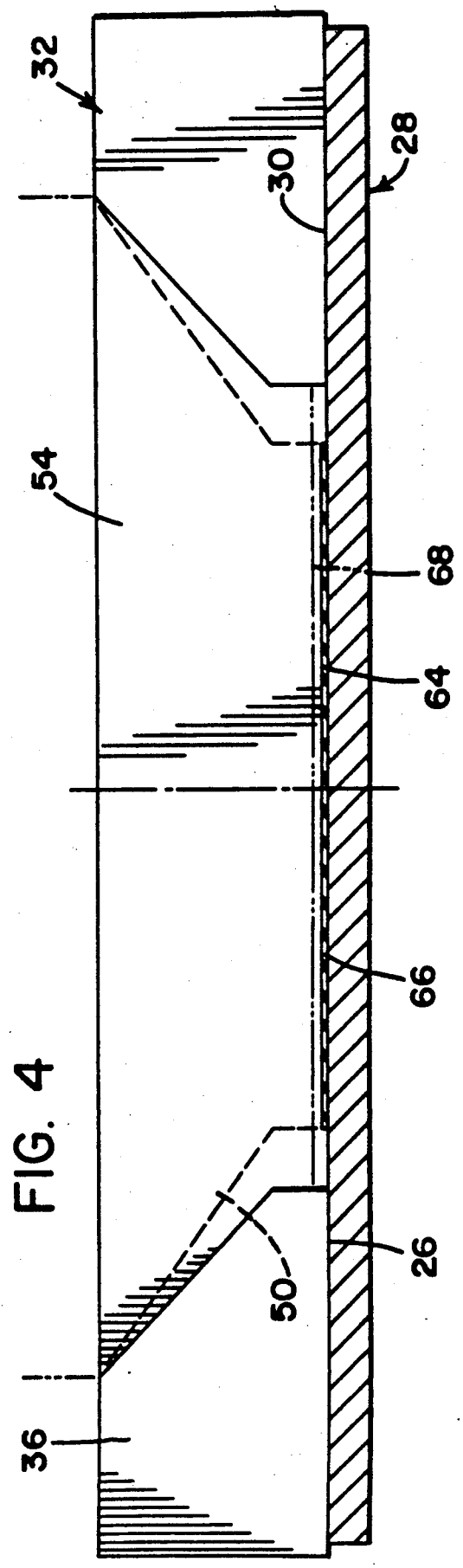
FIG. 4 is a plan view of the downstream grooved surface of the lower first die member taken along line 4—4 in FIG. 1.

Referring to FIGS. 2, 4 and 5, an edge 64 of the first grooved die member 32 is indented for shaping a first base strip 66 applied to the roller surface from the first preform passage 50, as shown in FIG. 3. The upstream plate die 44 has an edge 68 which is indented for shaping a second base strip 70 applied over the first base strip 66 on the roller surface 30 from the second preform passage 54. The second grooved die member 38 has an edge 72 which is indented for shaping a cap strip 74 applied over the second base strip 70 from the third preform passage 56. Finally the downstream plate die 46 has an edge 76 for shaping edge strips 78 and 80 applied over the edges of the cap strip 74 from the openings 60 and 62 in communication with the bifurcated fourth preform passages 58. In this manner, a tire tread band 82 is formed in a single coextrusion as shown in FIG. 3.

It can be seen that the first grooved die member 32 and the second grooved die member 38 as well as the upstream plate die 44 and downstream plate die 46 can be machined on a three-axis milling machine and no drilling or hand finishing is required to make these parts.

Figure 6:
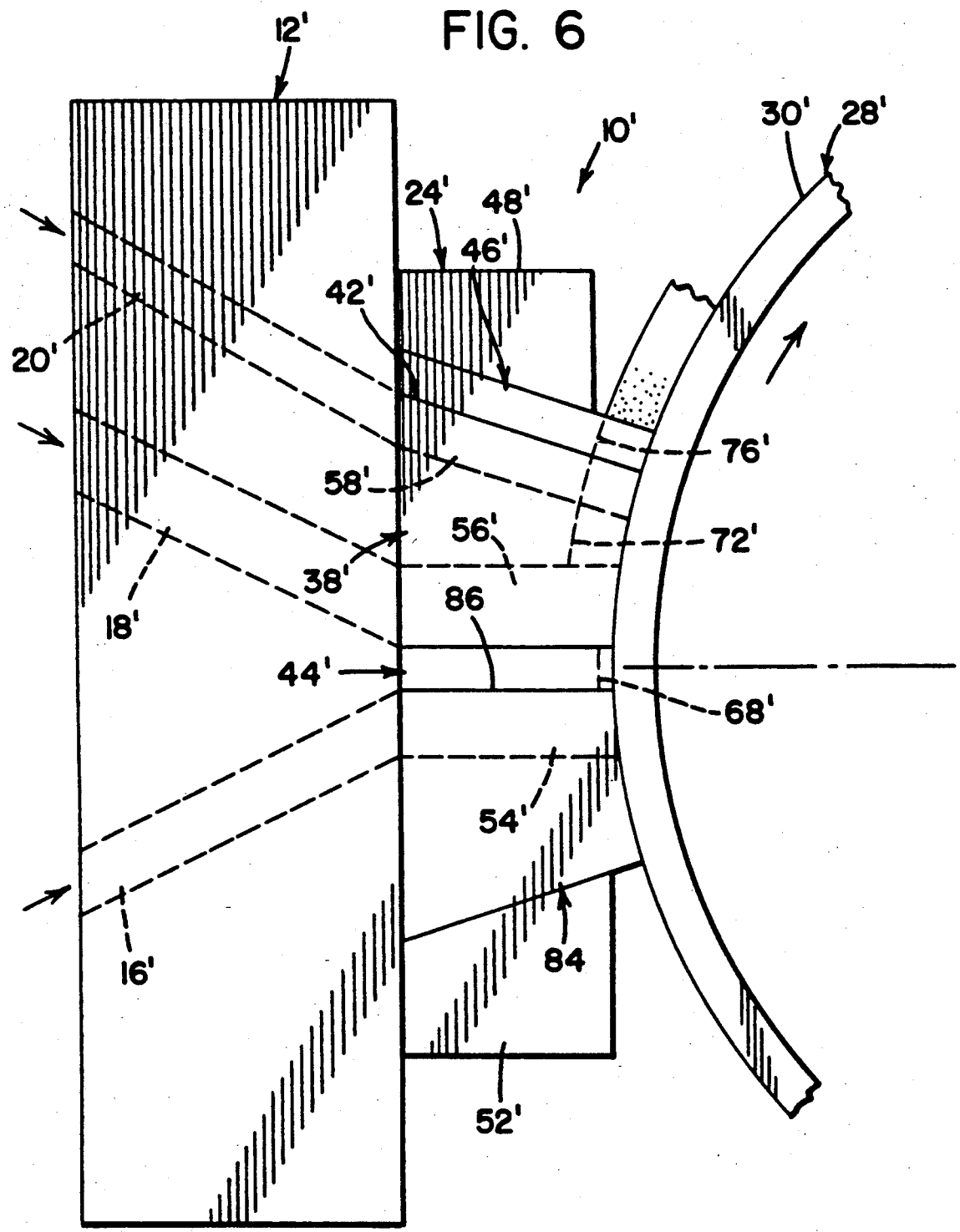
FIG. 6 is a schematic side view of a triplex roller die assembly embodying the invention with the flow channels shown in dotted lines.

It is understood that this invention may be applied to roller die extrusion apparatus with more extruders than the quadruple system shown in FIG. 1 or with fewer extruders such as a dual extruder system or a triplex extruder system such as that shown in FIG. 6. In this modification, the parts which are the same as those in the embodiment of FIGS. 1 through 5 are identified with the same numeral and a prime mark. The first flow channel 14 has been eliminated and a third grooved die member 84 having a downstream grooved surface 86 but no upstream grooved surface has been substituted for the first grooved die member 32. In all other respects the embodiment of FIG. 6 is the same as the embodiment of FIGS. 1 through 5 and will provide a tire tread band similar to the tread band 82, shown in FIG. 3, but without the first base strip 66. Instead, the second base strip 70 will have the same cross section as the combined first base strip 66 and the second base strip 70, as shown in FIG. 3.

Figure 7:
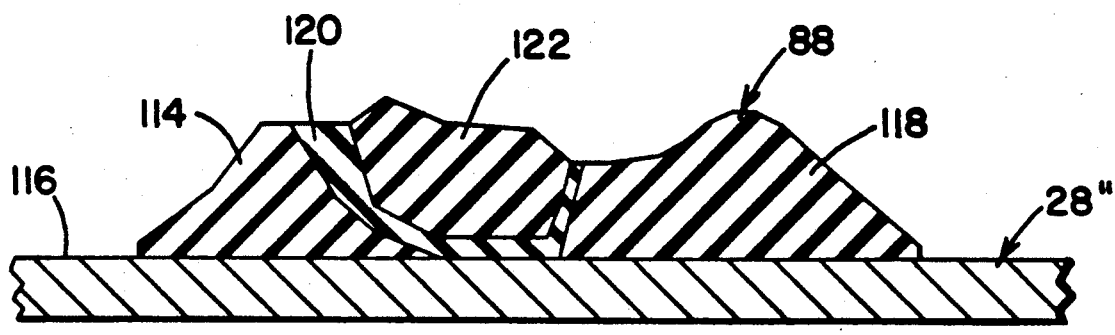
FIG. 7 is an enlarged fragmentary, sectional view of a formed sidewall coextrusion showing the contour of the strips as applied and shaped at sections along lines 3a—3a, 3b—3b, 3c—3c and 3—3 in FIG. 1 of the modification shown in FIG. 8.
Figure 8:
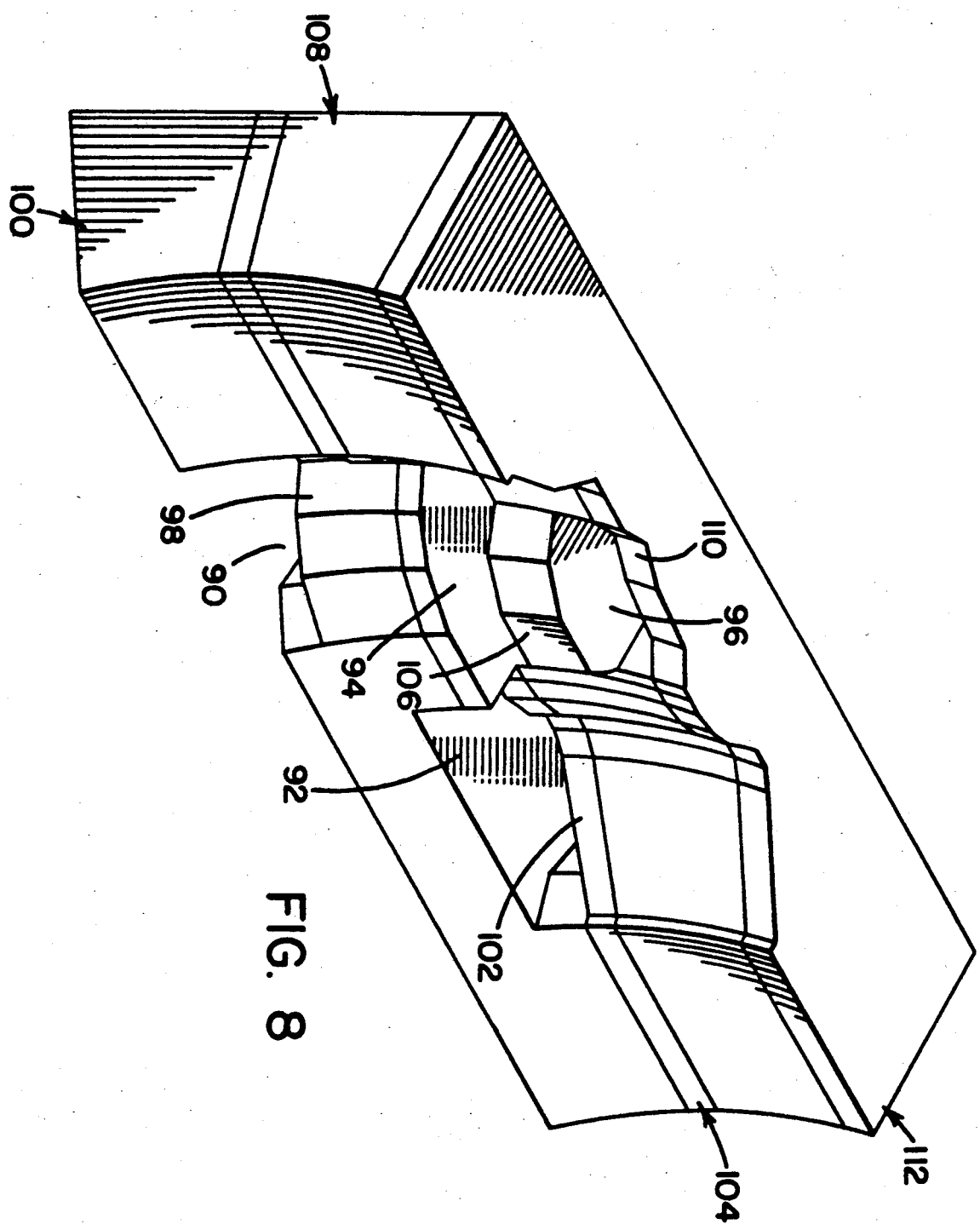
FIG. 8 is a perspective view of a modified, laminated die for a roller die assembly embodying the invention adapted to form the sidewall coextrusion shown in FIG. 7.

Referring to FIGS. 7 and 8, the quadruple extruder roller die extrusion apparatus 10 shown in FIG. 1 has been modified to provide a tire sidewall band 88 as shown in FIG. 7. The parts in this embodiment are the same as the parts in the embodiment of FIGS. 1 through 5 except that first preform passage 90, second preform passage 92, third preform passage 94 and fourth preform passage 96 have a different configuration from the preform passages 50, 54, 56 and 58 of the embodiment shown in FIGS. 1 and 2. In addition, indentations at an edge 98 of a first grooved die member 100, indentations at an edge 102 of an upstream plate die 104, indentations at an edge 106 of a second grooved die member 108 and indentations at an edge 110 of a downstream plate die 112 have been changed to provide the strips shown in FIG. 7. For example, the first indentation in the edge 98 of the first grooved die member 100 is for shaping a left side strip 114 applied to the roller surface 116 from the first preform passage 90. A right side strip 118 is shaped by a second indentation in the edge 102 of the upstream plate die 104 which is applied to the roller surface 116 from the second preform passage 92. A center strip 120 is shaped by a third indentation in the edge 106 of the second groove die member 108 and is applied over the left side strip 114, the right side strip 118 and the roller surface 116 from the third preform passage 94. Finally, a white sidewall strip 122 is shaped by a fourth indentation in the edge 110 of the downstream plate die 112 and is applied over the center strip 120 on the roller from the fourth preform passage 96. In this way, a single coextrusion is formed for the tire sidewall band 88. In all other respects, the embodiment of FIGS. 7 and 8 is identical with the embodiment of FIGS. 1 through 5 and those parts which are the same are identified by the same numbers with a double prime mark.

While a certain representative embodiments and details have been shown for the purpose of illustrating the invention, it will be apparent to those skilled in the art that various changes and modifications may be made therein without departing from the spirit or scope of the invention.

We claim:

1. A roller die extrusion apparatus for combining two or more extruded strips of elastomeric materials into a single coextrusion, said apparatus having a roller with an axis circumvented by a roller surface and means for rotating said roller about said axis, a die head having flow channels in communication with extruders for supplying said strips, a die holder mounted on said die head and positioned adjacent to said roller surface, a laminated die means mounted in said die holder and having a cylindrical surface conforming substantially to said roller surface, said laminated die means comprising a pair of grooved die members having grooved surfaces forming preform passages extending from said flow channels to openings in said cylindrical surface of said laminated die means, an interchangeable downstream plate die disposed between one of said grooved die members and said die holder, an interchangeable upstream plate die disposed between said grooved die members, said grooved surfaces of said grooved die members being in abutting engagement flat surfaces of said downstream plate die and said upstream plate die forming at least some of said preform passages, and strip shaping indentations at an edge of said upstream plate die, an edge of said downstream plate die and at least one edge of one of said grooved die members adjoining said roller surface for shaping and guiding said strips after application to said roller surface to form said single coextrusion.

2. The roller die extrusion apparatus of claim 1 wherein at least one of said grooved surfaces has more than one groove forming more than one of said preform passages and each of said preform passages being in communication with one of said flow channels.

3. The roller die extrusion apparatus of claim 1 wherein said die holder includes retaining members in engagement with said downstream plate die and one of said grooved die members to hold said laminated die means in said die holder.

4. The roller die extrusion apparatus of claim 3 wherein said grooved die members include a first grooved die member upstream from said upstream plate die and a second grooved die member upstream from said downstream plate die.

5. The roller die extrusion apparatus of claim 1 wherein said flow channels comprise a first flow channel in communication with a first preform passage disposed between said die holder and said first grooved die member, a second flow channel in communication with a second preform passage disposed between said first grooved die member and the flat surfaces of said upstream plate member, a third flow channel in communication with a third preform passage disposed between the flat surfaces of said upstream plate member and said second grooved die member and a fourth flow channel in communication with a fourth preform passage disposed between the flat surfaces of said downstream plate member and said second grooved die member.

6. The roller die extrusion apparatus of claim 5 wherein said fourth preform passage is bifurcated for communication with two of said openings in said cylindrical surface of said laminated die means.

7. The roller die extrusion apparatus of claim 5 wherein said strip shaping indentations include a first strip shaping indentation in the edge of said first grooved die member for shaping a first base strip applied to said roller surface from said first preform passage, a second strip shaping indentation in the edge of said upstream plate die for shaping a second base strip applied over said first base strip on said roller surface from said second preform passage, a third strip shaping indentation in said second grooved die member for shaping a cap strip applied over said second base strip on said roller from said third preform passage and a fourth strip shaping indentation in said downstream plate die for shaping edge strips applied over the edges of said cap strip on said roller from said fourth preform passage to form said single coextrusion for a tire tread band.

8. The roller die extrusion apparatus of claim 1 wherein said flow channels comprise a first flow channel in communication with a first preform passage disposed between said first grooved die member and the flat surface of said upstream plate die, a second flow channel in communication with a second preform passage disposed between the flat surfaces of said upstream plate die and said first grooved die member and a third flow channel in communication with a third preform passage disposed between the flat surface of said downstream plate die and said second grooved die member to form a single coextrusion from three strips of material.

9. The roller die extrusion apparatus of claim 5 wherein said strip shaping indentations include a first indentation in the edge of said first grooved die member for shaping a left side strip applied to said roller surface from said first preform passage, a second indentation in the edge of said upstream plate die for shaping a right side strip applied on said roller surface from said second preform passage, a third strip shaping indentation in said second grooved die member for shaping a center strip applied over said left side strip, right side strip and said roller surface from said third preform passage and a fourth strip shaping indentation in said downstream plate die for shaping a white sidewall strip applied over said center strip on said roller from said fourth preform passage to form said single coextrusion for a tire sidewall band.

10. A roller die extrusion apparatus for combining two or more extruded strips of elastomeric materials into a single coextrusion, said apparatus having a roller with an axis circumvented by a roller surface and means for rotating said roller about said axis, a die head having flow channels in communication with extruders for supplying said strips, a die holder mounted on said die head and positioned adjacent to said roller surface, a laminated die means mounted in said die holder and having a cylindrical surface conforming substantially to said roller surface, said laminated die means comprising a grooved die member having grooved surfaces forming preform passages extending from said flow channels to openings in said cylindrical surface of said laminated die means, an interchangeable downstream plate die disposed between said grooved die member and said die holder, at least one of said grooved surfaces of said grooved die member being in abutting engagement with flat surfaces of said downstream plate die forming at least one of said preform passages, and strip shaping indentations at an edge of said downstream plate die and at an edge of said grooved die member adjoining said roller surface for shaping and guiding said strips after application to said roller surface to form said single coextrusion.

* * * * *